United States Patent
Wikström et al.

(10) Patent No.: US 10,880,947 B2
(45) Date of Patent: Dec. 29, 2020

(54) CONTROL PLANE LATENCY REDUCTION IN A WIRELESS COMMUNICATIONS NETWORK

(71) Applicant: Telefonaktiebolaget LM Ericsson (publ), Stockholm (SE)

(72) Inventors: Gustav Wikström, Täby (SE); Magnus Stattin, Upplands Väsby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 203 days.

(21) Appl. No.: 15/750,730

(22) PCT Filed: Dec. 22, 2017

(86) PCT No.: PCT/SE2017/051340
§ 371 (c)(1),
(2) Date: Feb. 6, 2018

(87) PCT Pub. No.: WO2018/139966
PCT Pub. Date: Aug. 2, 2018

(65) Prior Publication Data
US 2020/0084823 A1    Mar. 12, 2020

Related U.S. Application Data

(60) Provisional application No. 62/449,902, filed on Jan. 24, 2017.

(51) Int. Cl.
*H04W 76/27* (2018.01)
*H04W 76/19* (2018.01)
(Continued)

(52) U.S. Cl.
CPC ......... *H04W 76/27* (2018.02); *H04W 36/305* (2018.08); *H04W 56/001* (2013.01);
(Continued)

(58) Field of Classification Search
CPC ... H04W 76/27; H04W 76/19; H04W 56/001; H04W 56/0045; H04W 72/0413; H04W 36/305
(Continued)

(56) References Cited

U.S. PATENT DOCUMENTS

| | | | |
|---|---|---|---|
| 2017/0273056 A1* | 9/2017 | Papasakellariou .. | H04W 52/281 |
| 2017/0311278 A1* | 10/2017 | Adjakple ............... | H04W 60/00 |
| 2019/0230732 A1* | 7/2019 | Yu ........................ | H04W 72/042 |

OTHER PUBLICATIONS

3GPP TS 36.331 V14.1.0 (Dec. 2016) (Year: 2016).*
(Continued)

*Primary Examiner* — William Nealon
(74) *Attorney, Agent, or Firm* — Christopher & Weisberg, P.A.

(57) ABSTRACT

Methods and apparatuses are disclosed for setting a processing time for a wireless device, WD, to respond to a radio resource control, RRC, connection resume message are disclosed. According to one aspect, a method in a base station includes determining when short processing time conditions exist in relation to the establishment or reconfiguration of the RRC connection for the WD; when short processing time conditions exist, sending to the WD a message indicating a short processing time; and when short processing time conditions do not exist, sending to the WD a message indicating a legacy processing time.

22 Claims, 8 Drawing Sheets

(51) Int. Cl.
　　　*H04W 36/30*　　(2009.01)
　　　*H04W 56/00*　　(2009.01)
　　　*H04W 72/04*　　(2009.01)

(52) U.S. Cl.
　　　CPC ... *H04W 56/0045* (2013.01); *H04W 72/0413* (2013.01); *H04W 76/19* (2018.02)

(58) Field of Classification Search
　　　USPC ........................................................ 455/436
　　　See application file for complete search history.

(56) References Cited

OTHER PUBLICATIONS

3GPP Meeting #86bis, R1-1608644 (Oct. 2016) (Year: 2016).*
International Search Report and Written Opinion dated Mar. 12, 2018 for International Application No. PCT/SE2017/051340 filed on Dec. 22, 2017, consisting of 13-pages.
3GPP TS 36.331 v14.1.0; 3rd Generation Partnership Project; Technical Specification Group Radio Access Network; Evolved Universal Terrestrial Radio Access (E-UTRA); Radio Resource Control (RRC); Protocol specification (Release 14); Dec. 2016, consisting of 654-pages.
3GPP TSG RAN WG1 Meeting #86bis R1-1608644; Title: Design on shortened processing time for 1ms TTI; Agenda Item: 7.2.10.1; Source: Huawei, HiSilicon; Document for: Discussion and decision; Location and Date: Lisbon, Portugal, Oct. 10-14, 2016, consisting of 5-pages.
3GPP TS 36.213 V14.0.0; 3rd Generation Partnership Project; Technical Specification Group Radio Access Network; Evolved Universal Terrestrial Radio Access (E-UTRA); Physical layer procedures (Release 14); Sep. 2016 consisting of 406-pages.
3GPP TS 36.321 V14.0.0; 3rd Generation Partnership Project; Technical Specification Group Radio Access Network; Evolved Universal Terrestrial Radio Access (E-UTRA); Medium Access Control (MAC) protocol specification (Release 14); Sep. 2016 consisting of 96-pages.
Japanese Notice of Reasons for Rejection with English Summary dated Sep. 23, 2020 issued for Application No. 2019-539906, consisting of 3-pages.

* cited by examiner

CONTROL PLANE LATENCY REDUCTION IN A WIRELESS COMMUNICATIONS NETWORK

CROSS-REFERENCE TO RELATED APPLICATIONS

This application is a Submission Under 35 U.S.C. § 371 for U.S. National Stage Patent Application of International Application Number: PCT/SE2017/051340, filed Dec. 22, 2017 entitled "CONTROL PLANE LATENCY REDUCTION IN A WIRELESS COMMUNICATIONS NETWORK," which claims priority to U.S. Provisional Application No. 62/449,902, filed Jan. 24, 2017, entitled "CONTROL PLANE LATENCY REDUCTION IN LTE BY INDICATION OF PROCESSING REQUIREMENT," the entirety of both of which are incorporated herein by reference.

TECHNICAL FIELD

This disclosure relates to wireless communications, and in particular, to control plane latency reduction.

BACKGROUND

Random Access in long term evolution (LTE) is specified in $3^{rd}$ Generation Partnership Project (3GPP) documents 36.321 and 36.213. A number of signaling steps are required for a wireless device (WD) to perform initial access, and also for every time the WD transitions from "idle" mode to "connected" mode.

To handle small data transfers more efficiently, the 3GPP has studied methods to reduce the signaling overhead when transitioning from radio resource control (RRC) idle to RRC connected. One of the chosen solutions is introduction of an 'RRC resume' procedure, which is based on re-using the WD context from the previous RRC connection for the subsequent RRC connection setup. By storing the WD context in the base station, e.g., evolved node B (eNB), the signaling required for security activation and bearer establishment at the next RRC idle to RRC connected transition can be avoided.

RRC resume is realized by introducing two new procedures 'RRC Suspend' and 'RRC Resume'. The eNB suspends a connection by sending a 'RRC Connection Suspend' message to the WD. This is shown in FIG. 1. This may happen for example after the WD has been inactive for a certain period. Both the WD and eNB stores the WD context and the associated identifier (referred to as Resume ID). The WD context contains, for example, bearer configuration and security related parameters.

At the next transition from RRC idle to RRC connected, the WD resumes the connection by sending a 'RRC Connection Resume Request' to the eNB. This is shown in FIG. 2. The message contains the previously received Resume ID which the eNB uses to retrieve the WD context. An authorization token is also provided to allow the eNB to securely identify the WD. Assuming the WD context is found and the authorization token is valid, the eNB responds with a "RRC Connection Resume" to confirm that the connection is being resumed. The WD acknowledges the reception by sending "RRC Connection Resume Complete".

RRC resume procedure is not necessarily limited to a single cell or single eNB, but can also be supported across eNBs. Inter eNB connection resumption is handled using context fetching, whereby the resuming eNB retrieves the WD context from the suspending eNB over the X2 interface. The resuming eNB provides the Resume ID which is used by the suspending eNB to identify the WD context.

Note that the RRC Connection Suspend, RRC Connection Resume Request, RRC Connection Resume, and RRC Connection Resume Complete messages may differ in name in the final specification of RRC resume by the 3GPP.

In current LTE, the WD is expected to respond to a RRC Connection Resume message from the network with a RRC Connection Resume Complete. Before the WD responds, it applies the new configuration as indicated by the network.

In LTE, processing time for RRC procedures is specified in the RRC protocol specification. For example, processing time is specified for RRC connection establishment (RRC connection setup/RRC connection resume) and RRC connection reconfiguration procedures.

In legacy LTE, a WD sends RRC Connection Resume Complete with timing n+k subframes after receiving RRC Connection Resume (where n is the time at which the DL RRC message is received, and k is the processing delay requirement). The timing n+k is referred to herein as a legacy processing time. However, in some cases the processing time requirement is smaller than permitted by the legacy processing time.

SUMMARY

Some embodiments advantageously provide a method and system for setting a processing time for a wireless device, WD, to respond to a radio resource control, RRC, connection resume message. According to one aspect, a method in a base station comprises: determining when short processing time conditions exist in relation to the establishment or reconfiguration of the RRC connection for the WD; when short processing time conditions exist, sending to the WD a message indicating a short processing time; and when short processing time conditions do not exist, sending to the WD a message indicating a legacy processing time.

According to this aspect, in some embodiments, the message indicating the short processing time, or the message indicating the legacy processing time, is one of: an RRC connection resume message; a system information message; a L1/L2 control message; a L2 control message; and an RRC message. In some embodiments, the method includes storing a WD context at the base station when communication between the WD and the base station enters an idle state. In some embodiments, the method includes receiving from the WD a radio resource control, RRC, connection resume request. In some embodiments, the message indicates a time at which the WD is to transmit the RRC connection resume complete message. In some embodiments, determining when short processing time conditions exists includes determining that reconfiguration of the WD uses steps from a predefined set of steps. In some embodiments, determining when short processing time conditions exists includes determining that reconfiguration of the WD uses only parameters which are mandatory to signal. In some embodiments, determining when short processing time conditions exists includes determining that reconfiguration of the WD updates only security keys.

According to another aspect, a base station for setting a processing time for a wireless device, WD, to respond to a radio resource control, RRC, connection resume message is provided. The base station includes processing circuitry configured to: determine when short processing time conditions exist in relation to the establishment or reconfiguration of the RRC connection for the WD; a transmitter configured to: send to the WD an RRC connection resume message indicating an expectation of a short processing time, when short processing time conditions exist; and send to the WD an RRC connection resume message indicating an expectation of a legacy processing time when short processing time conditions do not exist.

According to this aspect, in some embodiments, the message indicating the short processing time, or the message indicating the legacy processing time, is one of: an RRC connection resume message; a system information message; a L1/L2 control message; a L2 control message; and an RRC message. In some embodiments, the processing circuitry is further configured to store a WD context at the base station when communication between the WD and the base station enters an idle state. In some embodiments, the base station also includes a receiver configured to receive from the WD a radio resource control, RRC, connection resume request. In some embodiments, the message indicates a time at which the WD is to transmit the RRC connection resume complete message. In some embodiments, determining when short processing time conditions exists includes determining that reconfiguration of the WD uses steps from a predefined set of steps. In some embodiments, determining when short processing time conditions exists includes determining that reconfiguration of the WD uses only parameters which are mandatory to signal. In some embodiments, determining when short processing time conditions exists includes determining that reconfiguration of the WD updates only security keys.

According to another aspect, a base station for setting a processing time for a wireless device, WD, to respond to a radio resource control, RRC, connection resume message is provided. A conditions determination module is configured to determine when short processing time conditions exist in relation to the establishment or reconfiguration of the RRC connection for the WD. A transmitter module is configured to send to the WD a message indicating a short processing time when short processing time conditions exist; and send to the WD a message indicating a legacy processing time when short processing time conditions do not exist.

According to this aspect, in some embodiments, the message indicating the short processing time, or the message indicating the legacy processing time, is one of: an RRC connection resume message; a system information message; a L1/L2 control message; a L2 control message; and an RRC message. In some embodiments, the base station includes a memory module configured to store a WD context at the base station when the WD goes into an idle state. A receiver module is configured to receive from the WD a radio resource control, RRC, connection resume request from the WD.

According to yet another aspect, a method in a wireless device, WD, for responding to a radio resource control, RRC, connection resume message from a base station, the RRC connection resume message relating to establishment or reconfiguration of an RRC connection for the WD, is provided. The method includes receiving from the base station the RRC connection resume message. The method includes determining from a message received from the base station when to send an RRC connection resume complete message. The method includes sending to the base station the RRC connection resume complete message at a first time when the message indicates a short processing time; and sending to the base station the RRC connection resume complete message at a second time when the message indicates a legacy processing time.

According to this aspect, in some embodiments, the message is one of: the RRC connection resume message; a system information message; a L1/L2 control message; a L2 control message; and an RRC message. In some embodiments, the message indicates a time at which the WD is to transmit the RRC connection resume complete message. In some embodiments, the WD determines a first time based on a processing time associated with a reconfiguration of the WD. In some embodiments, the processing time associated with a reconfiguration of the WD is known at the base station.

According to another aspect, there is provided a wireless device, WD, for responding to a radio resource control, RRC, connection resume message from a base station, the RRC connection resume message relating to establishment or reconfiguration of an RRC connection for the WD. The WD includes a receiver configured to receive from the base station the RRC connection resume message. The WD also includes processing circuitry configured to determine from a message received from the base station when to send an RRC connection resume complete message. A transmitter is configured to: send to the base station the RRC connection resume complete message at a first time when the message indicates a short processing time; and send to the base station the RRC connection resume complete message at a second time when the message indicates a legacy processing time.

According to this aspect, in some embodiments, the message is one of: the RRC connection resume message; a system information message; a L1/L2 control message; a L2 control message; and an RRC message. In some embodiments, the message indicates a time at which the WD is to transmit the RRC connection resume complete message. In some embodiments, the WD determines a first time based on a processing time associated with a reconfiguration of the WD. In some embodiments, the processing time associated with a reconfiguration of the WD is known at the base station.

According to yet another aspect, a wireless device, WD, for responding to a radio resource control, RRC, connection resume message from a base station, the RRC connection resume message relating to establishment or reconfiguration of an RRC connection for the WD, is provided. The WD includes a receiver module configured to receive from the base station the RRC connection resume message. The WD includes a transmission time determination module configured to determine from a message received from the base station when to send an RRC connection resume complete message. A transmitter module is configured to: send to the base station the RRC connection resume complete message at a first time when the message indicates a short processing time; and send to the base station the RRC connection resume complete message at a second time when the message indicates a legacy processing time.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
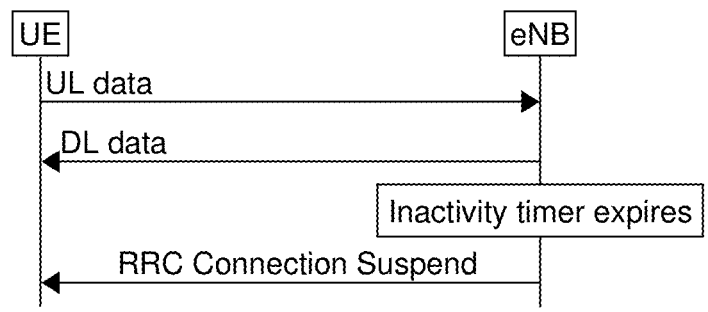
FIG. 1 is signal diagram showing suspension of an RRC connection between a WD and an eNB.
Figure 2:
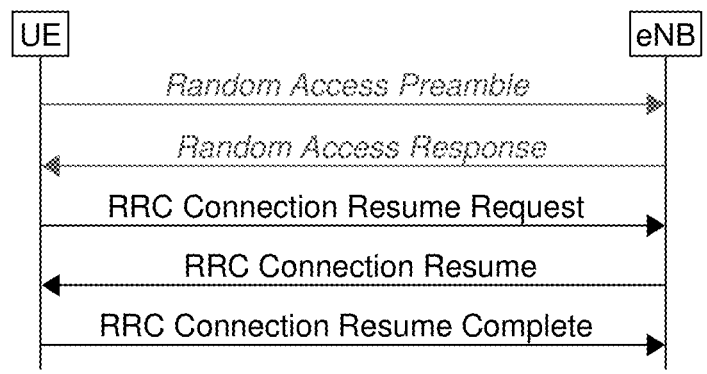
FIG. 2 is a signal diagram showing resumption of the RRC connection between the WD and the eNB.

Before describing in detail exemplary embodiments, it is noted that the embodiments reside primarily in combinations of apparatus components and processing steps related to control plane latency reduction by indication of processing requirements. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

In legacy LTE, a WD sends RRC Connection Resume Complete with timing n+k subframes after receiving RRC Connection Resume. However, in some cases the processing requirement is smaller and the processing can be done faster. As a means to reduce the transition time from IDLE to CONNECTED, the WD context from RRC CONNECTED can be stored by the network, and later fetched when the WD should resume to CONNECTED mode. This enables a shorter transition time.

Although reference is made to LTE and 3GPP compliant systems, the embodiments described herein are not so limited and may be implemented in other wireless communication systems. The term wireless device or mobile terminal used herein may refer to any type of wireless device communicating with a network node and/or with another wireless device in a cellular or mobile communication system. Examples of a wireless device are user equipment (UE), target device, device to device (D2D) wireless device, machine type wireless device or wireless device capable of machine to machine (M2M) communication, PDA, tablet, smart phone, laptop embedded equipped (LEE), laptop mounted equipment (LME), USB dongle, etc.

The term base station, e.g. a Radio Base Station (RBS), sometimes may be referred to herein as, e.g., evolved NodeB "eNB", "eNodeB", "NodeB", "B node", or BTS (Base Transceiver Station), depending on the technology and terminology used. The base stations may be of different classes such as, e.g., macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the wireless devices within range of the base stations. In the context of this disclosure, downlink (DL) refers to the transmission path from the base station to the wireless device. Uplink (UL) refers to the transmission path in the opposite direction, i.e., from the wireless device to the base station.

In 3GPP LTE, base stations may be directly connected to one or more core networks. Further, although embodiments are described with reference to base stations, it is understood that the embodiments described herein can be implemented in or across any suitable network node, of which base stations are a type.

Embodiments provide a way to signal the processing requirement to a new WD in the RRC Connection Resume. If short processing is indicated, the WD replies with RRC Connection Resume Complete along with new timing $n+k_{new}$ subframes. It will be understood by those skilled in the art that the timings referred to herein can be defined in terms of subframes or any other suitable timing metric (e.g., milliseconds, seconds, frames, transmission time intervals, slots, symbols, etc).

Figure 3:
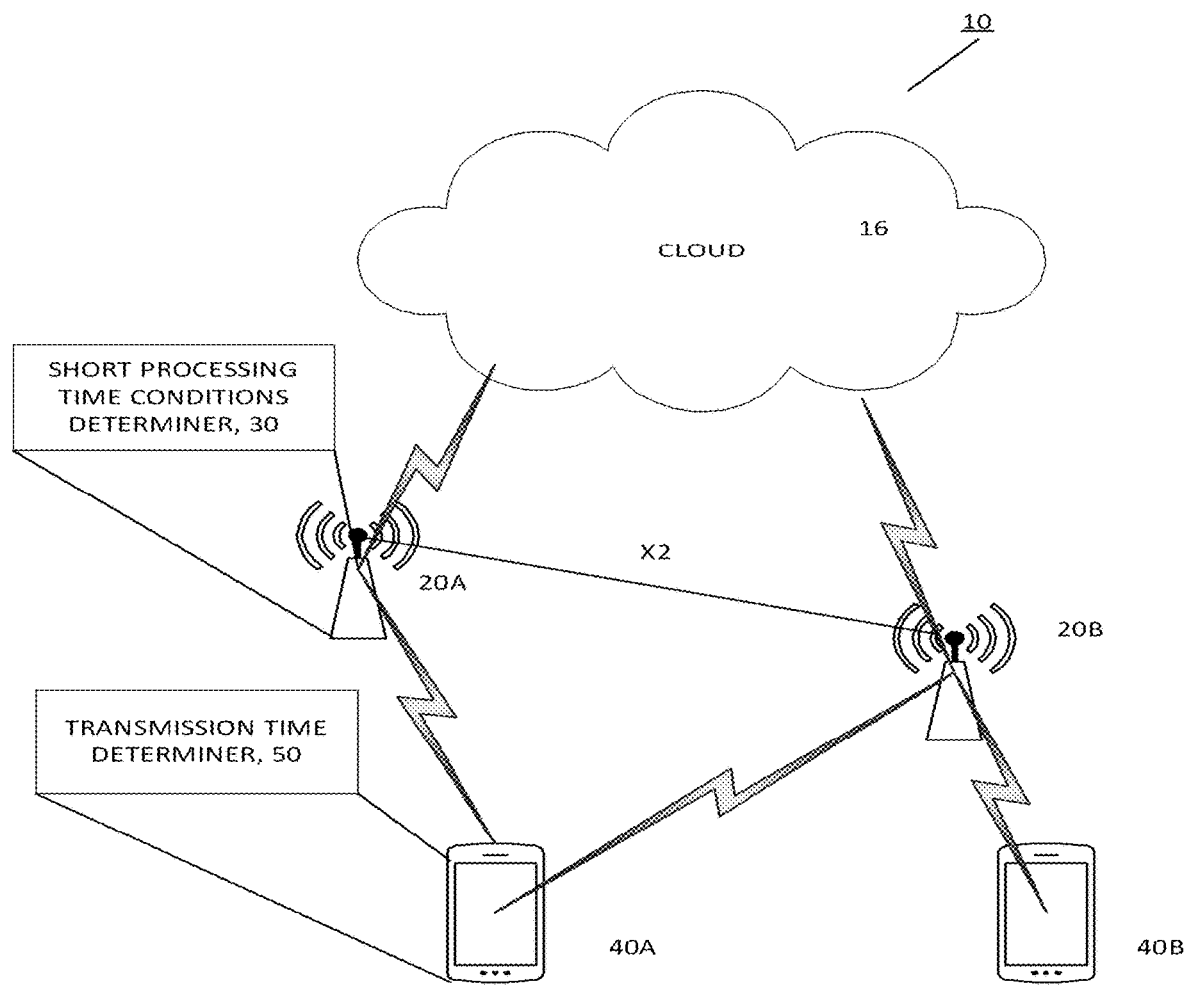
FIG. 3 is diagram of wireless communication network configured according to principles set forth herein.

FIG. 3 is a diagram of a wireless communication network 10 configured for setting a processing time between an idle state and a connected state of a WD. The system typically includes multiple base stations referred to collectively herein as base stations 20. For ease of reference only two base stations 20A and 20B (collectively referred to herein as base stations 20) are shown in FIG. 3. The base stations 20 typically may be in communication with a plurality of wireless devices referred to collectively herein as WDs 40. For ease of reference only two WDs 40A and 40B are shown in FIG. 3. The base stations 20 may also be in communication with each other by an X2 interface. Further, the base stations 20 may typically be in communication with a network cloud 16 that may include a backhaul network, the Internet and the public switched telephone network (PSTN). Although embodiments are described herein with reference to certain functions being performed by base stations 20, it is understood that the functions can be performed in other network nodes and elements. It is also understood that the functions of the base stations 20 or other network nodes can be distributed across network cloud 16 so that other nodes can perform one or more functions or even parts of functions described herein.

In some embodiments described herein, the base stations 20 may include a short processing time conditions determiner 30 to determine whether conditions exists to indicate to the WD 40 that a short processing time is to be implemented. In some embodiments, the WDs 40 may include a transmission time determiner 50 for determining whether the time for transmitting the RRC connection resume complete message is to be sent after a short processing time or after a legacy processing time.

During RRC Resume, the base station 20 fetches the stored context for a WD 40. In the context, the base station 20 may identify a WD 40 as being a new WD. For a new WD, the base station 20 identifies the processing steps required in the WD 40 before it can transmit the RRC Connection Resume Complete message.

The condition for which processing time to apply may be based on complexity. If no complex reconfiguration is needed in the WD 40, the base station 20 may conclude that a shorter processing time can be applied. Otherwise, a legacy processing time may be applied.

In an embodiment, if a predefined set of reconfigurations and/or steps of reconfiguration (or a subset thereof) is required in the WD 40, the base station 20 may conclude that a shorter processing time can be applied. In some embodiments, when a reconfiguration comprises only parameters which must be signalled (i.e., cannot be omitted from signaling) and other parameters remain the same and may be restored from a stored/cached WD context, the base station 20 may conclude that a shorter processing time can be applied.

As another example, in some embodiments, when a reconfiguration updates only aspects of the WD configuration/state which must be changed (e.g., security keys for ciphering) and other configuration/state remains the same and may be restored from a stored/cached WD context, the base station 20 may conclude that a shorter processing time can be applied.

The set of reconfiguration actions that require a longer processing time in the WD 40 can be known to the network and the WD 40. If any of these actions is required during the reconfiguration, the longer time is explicitly or implicitly indicated and assumed by both network and WD 40, otherwise the shorter time is assumed. As a baseline, the actions for RRC connection resume when the WD 40 has remained in the cell as specified in the context may be assumed to be associated with the shorter time.

In one embodiment, the network, e.g., base station 20, indicates to the WD 40 in a sysinfo (SI) message that a reduced processing time is expected. In other embodiments, the network may indicate the expectation of reduced processing time in layer 1/layer 2 (L1/L2) control signaling; e.g., with downlink control information (DCI) on L1/L2 control channel (e.g., physical downlink control channel (PDCCH)), with L2 control (e.g., media access control (MAC) control element) or with layer 3 (L3) control (e.g., in RRC message). Based on the received indication, the WD 40 then applies the rules related to explicit or implicit indication of timing as formulated in the subsections below.

The base station 20 may indicate the timing of the RRC Connection Resume Complete message in the RRC Connection Resume message. This indication can be one bit (flag) indicating either long (legacy) timing n+k subframes or short (new) timing $n+k_{new}$ subframes. In one embodiment, $k_{new}$ is explicitly indicated with 3 bits. In another embodiment, $k_{new}$ is indicated as $k_{new}=k-k_{step}$, where k is the legacy timing and $k_{step}$ is indicated with 2 bits. The times $k_{new}$ and/or $k_{step}$ can be hardcoded in a specification, be signaled as an absolute value or signaled as an index into a table in a specification providing implicit determination of timing.

In one embodiment, the processing timing is not explicitly indicated to the WD 40 by the network, e.g., base station 20. Instead the WD determines the required processing time from the set of tasks required in the reconfiguration. The mapping between reconfiguration tasks and processing time is known in both the WD 40 and the network, e.g., base station 20.

In one example, the short processing time is applied when the reconfiguration requires reconfigurations/processing steps/tasks/actions from a predefined/specified set of reconfigurations/processing steps/tasks/actions; and long (legacy) timing otherwise.

In another example, the short processing time can apply when a reconfiguration comprises only parameters which are mandatory to signal (i.e., cannot be omitted from signaling) and other parameters remain the same and may be restored from a stored/cached WD context; and long (legacy) timing otherwise.

In another example, the short processing time can apply when a reconfiguration updates only aspects of the WD configuration/state which must be changed (e.g., security keys for ciphering) and other configuration/state remains the same and may be restored from a stored/cached WD context; and long (legacy) timing otherwise.

The WD 40 applies the indicated timing n+k subframes or $n+k_{new}$ subframes for the transmission of RRC Connection Resume Complete.

The base station 20 schedules and expects to receive the RRC Connection Resume Complete n+k or $n+k_{new}$ subframes after RRC Connection Resume has been sent.

The base station 20 identifies a new WD 40 from the stored context during RRC Resume, and assesses the processing need in the WD 40. If a reduced timing can be used, it is signaled in the RRC Connection Resume message. The WD 40 applies the indicated timing for the RRC Connection Resume Complete message.

Figure 4:
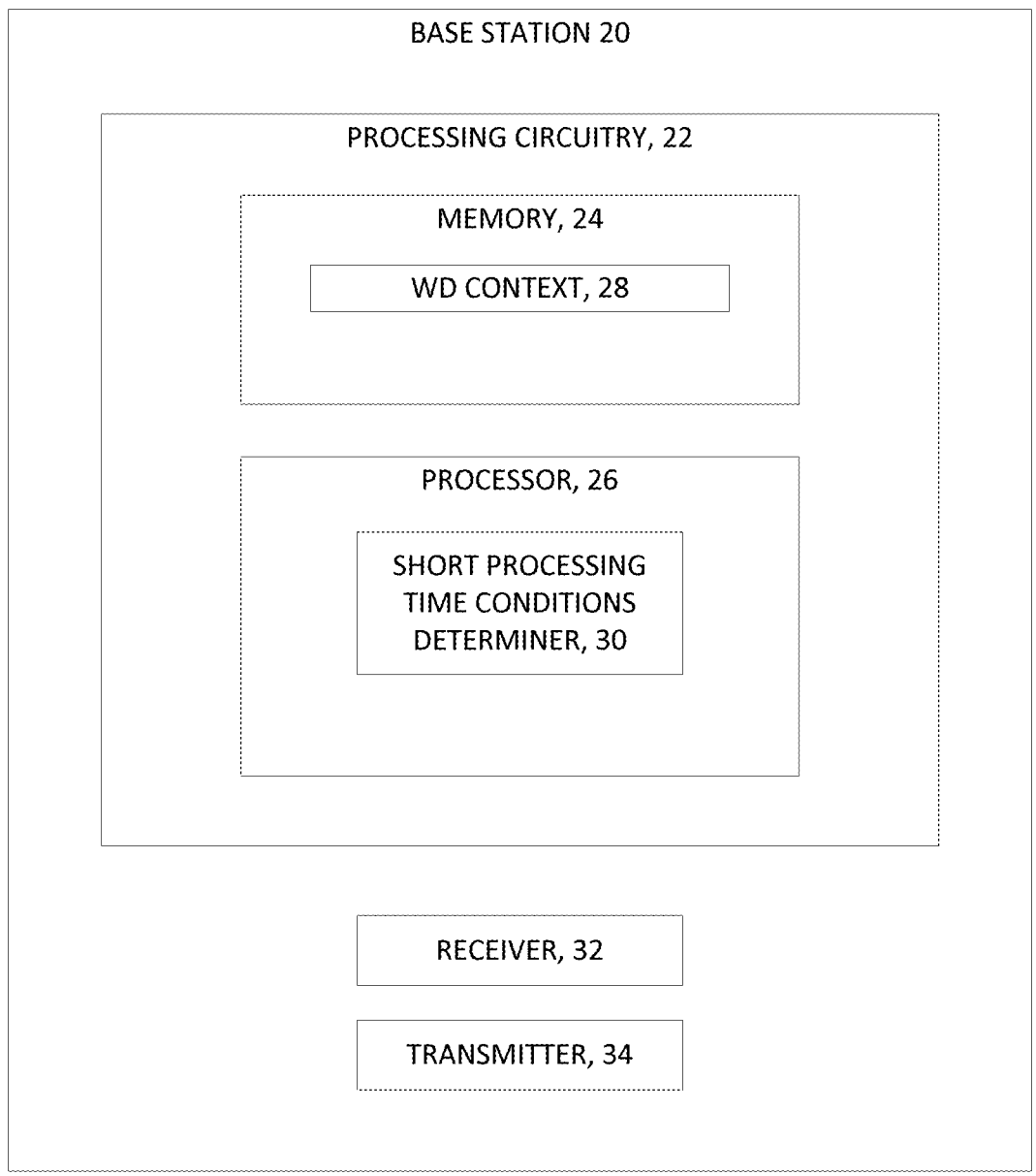
FIG. 4 is a block diagram of a base station configured according to principles set forth herein.

FIG. 4 is a block diagram of an embodiment of a base station 20 that includes processing circuitry 22. In some embodiments, the processing circuitry may include a memory 24 and processor 26, the memory 24 containing instructions which, when executed by the processor 26, configure processor 26 to perform the one or more functions described herein. In addition to a traditional processor and memory, processing circuitry 22 may comprise integrated circuitry for processing and/or control, e.g., one or more processors and/or processor cores and/or FPGAs (Field Programmable Gate Array) and/or ASICs (Application Specific Integrated Circuitry).

Processing circuitry 22 may include and/or be connected to and/or be configured for accessing (e.g., writing to and/or reading from) memory 24, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code executable by control circuitry and/or other data, e.g., data pertaining to communication, e.g., configuration and/or address data of nodes, etc. Processing circuitry 22 may be configured to control any of the methods described herein and/or to cause such methods to be performed, e.g., by processor 26. Corresponding instructions may be stored in the memory 24, which may be readable and/or readably connected to the processing circuitry 22. In other words, processing circuitry 22 may include a controller, which may comprise a microprocessor and/or microcontroller and/or FPGA (Field-Programmable Gate Array) device and/or ASIC (Application Specific Integrated Circuit) device. It may be considered that processing circuitry 22 includes or may be connected or connectable to memory, which may be configured to be accessible for reading and/or writing by the controller and/or processing circuitry 22.

The memory 24 is configured to store the WD context 28. The processor 26 includes a short processing time condition determiner 30 which is configured to determine whether conditions exists to indicate to the WD 40 that a short processing time is to be implemented. A receiver 32 is configured to receive from the WD 40 a radio resource control, RRC, connection resume request from the WD 40.

A transmitter 34 is configured to send to the WD 40 an RRC connection resume message indicating an expectation of a short processing time, when short processing time conditions exist, and to send to the WD 40 an RRC connection resume message indicating an expectation of a legacy processing time when short processing time conditions do not exist.

Figure 5:
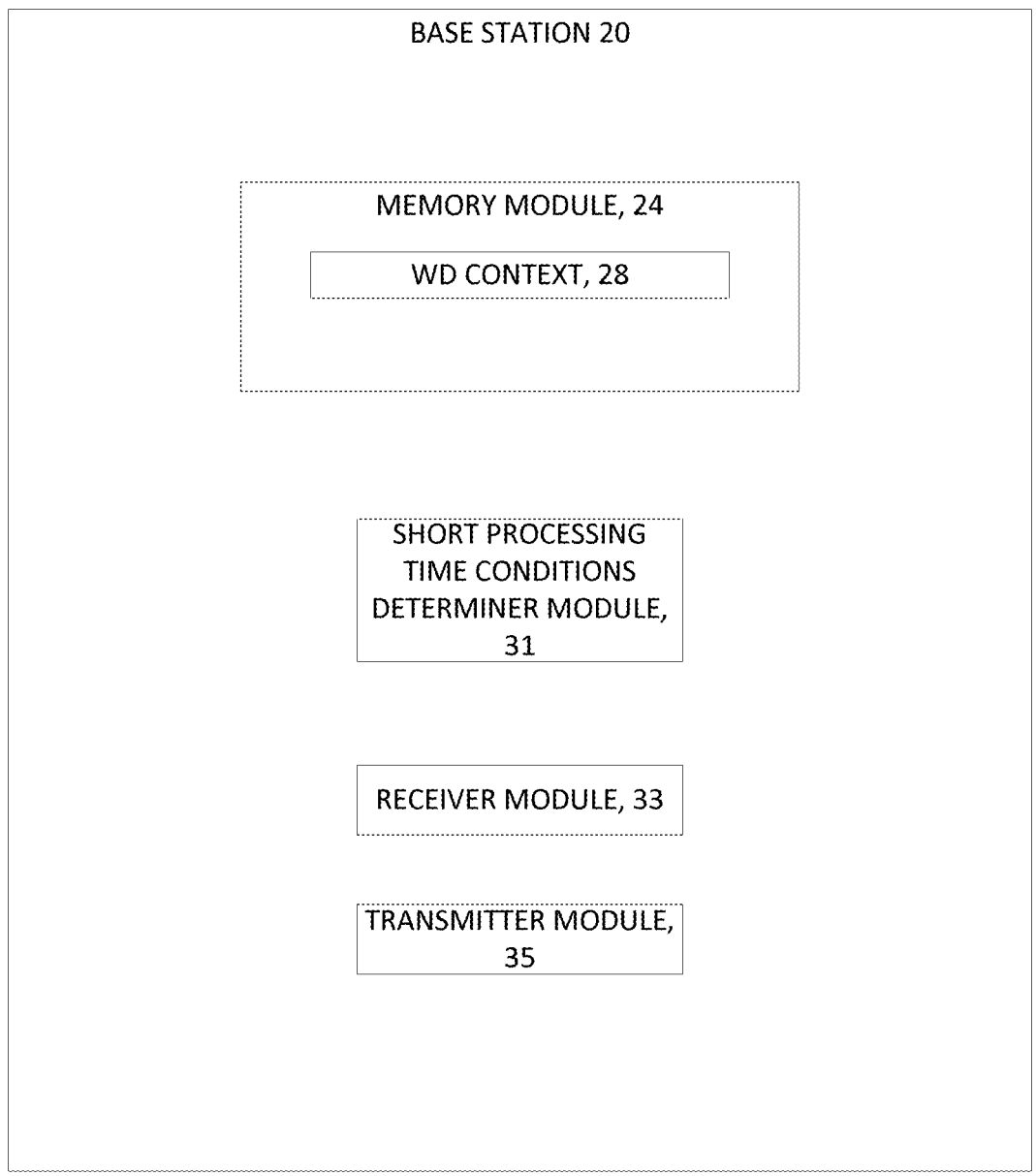
FIG. 5 is a block diagram of an alternative embodiment of a base station configured according to principles set forth herein.

FIG. 5 is block diagram of an alternative embodiment of the base station 20 that may be implemented at least in part with software modules executable by a processor. A short processing time conditions determiner module 31 is configured to cause a processor to determine when short processing time conditions exist. The receiver module 33 is configured to receive from the WD 40, an RRC connection resume request. The transmitter module 35 is configured send to the WD 40 an RRC connection resume message.

Figure 6:
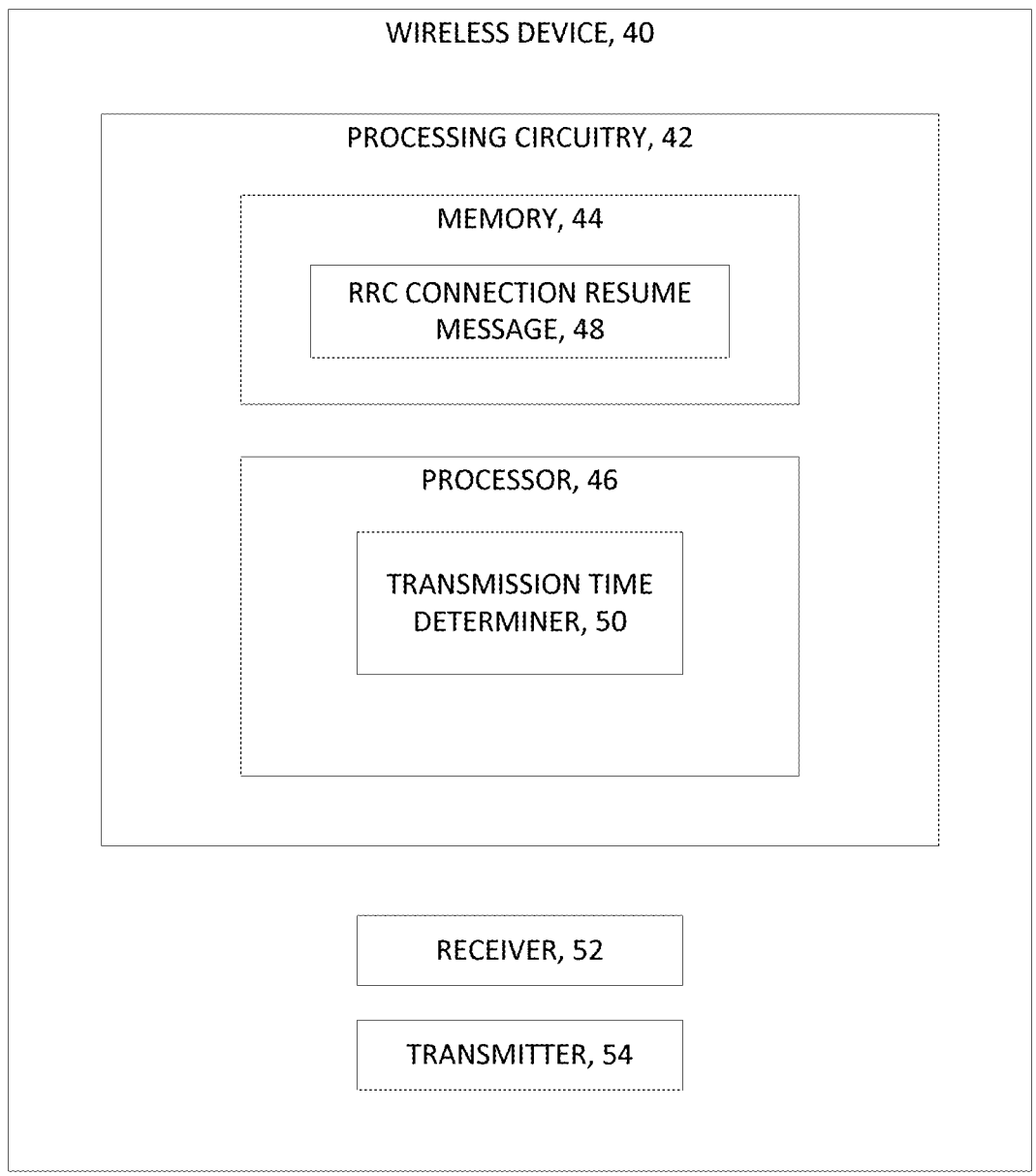
FIG. 6 is a block diagram of a wireless device configured according to principles set forth herein.

FIG. 6 is a block diagram of a wireless device 40 having processing circuitry 42. In some embodiments, the processing circuitry may include a memory 44 and processor 46, the memory 44 containing instructions which, when executed by the processor 46, configure processor 46 to perform the one or more functions described herein. In addition to a traditional processor and memory, processing circuitry 42 may comprise integrated circuitry for processing and/or control, e.g., one or more processors and/or processor cores and/or FPGAs (Field Programmable Gate Array) and/or ASICs (Application Specific Integrated Circuitry).

Processing circuitry 42 may include and/or be connected to and/or be configured for accessing (e.g., writing to and/or reading from) memory 44, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 44 may be configured to store code executable by control circuitry and/or other data, e.g., data pertaining to communication, e.g., configuration and/or address data of nodes, etc. Processing circuitry 42 may be configured to control any of the methods described herein and/or to cause such methods to be performed, e.g., by processor 46. Corresponding instructions may be stored in the memory 44, which may be readable and/or readably connected to the processing circuitry 42. In other words, processing circuitry 42 may include a controller, which may comprise a microprocessor and/or microcontroller and/or FPGA (Field-Programmable Gate Array) device and/or ASIC (Application Specific Integrated Circuit) device. It may be considered that processing circuitry 42 includes or may be connected or connectable to memory, which may be configured to be accessible for reading and/or writing by the controller and/or processing circuitry 42.

The memory 44 is configured to store an RRC connection resume message 48. The processor 46 implements a transmission time determiner 50 configured to determine from the RRC connection resume message when to send an RRC connection resume complete message. The receiver 52 is configured to receiving from the base station 20 the RRC connection resume message. The transmitter 54 is configured to send to the base station 20 the RRC connection resume complete message at a first time when the RRC connection resume message indicates an expectation of a short processing time, and send to the base station 20 the RRC connection resume complete message at a second time when the RRC connection resume message indicates an expectation of a legacy processing time.

Figure 7:
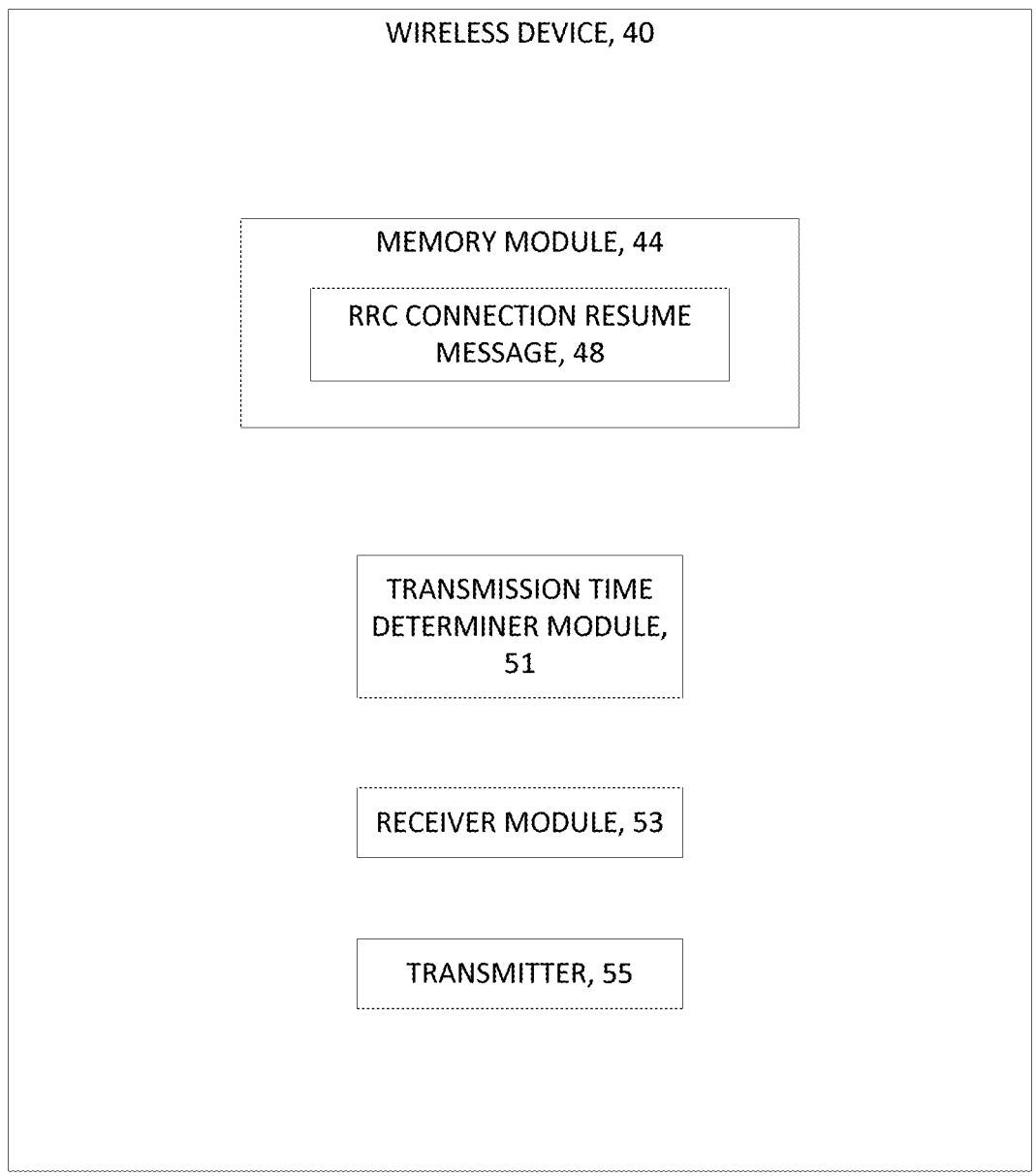
FIG. 7 is a block diagram of an alternative embodiment of a wireless device configured according to principles set forth herein.

FIG. 7 is a block diagram of an alternative embodiment of the WD 40 that includes a transmission time determiner module 51 configured to determine from the RRC connection resume message when to send an RRC connection resume complete message. The receiver module 53 is configured to receive from the base station 20 the RRC connection resume message. The transmitter module 55 is configured to send to the base station the RRC connection resume complete message at a first time when a message received from the base station (e.g. the RRC connection resume message) indicates an expectation of a short processing time, and send to the base station the RRC connection resume complete message at a second time when the RRC connection resume message indicates an expectation of a legacy processing time. The first time is based on the short processing time and the second time is based on the legacy processing time.

Figure 8:
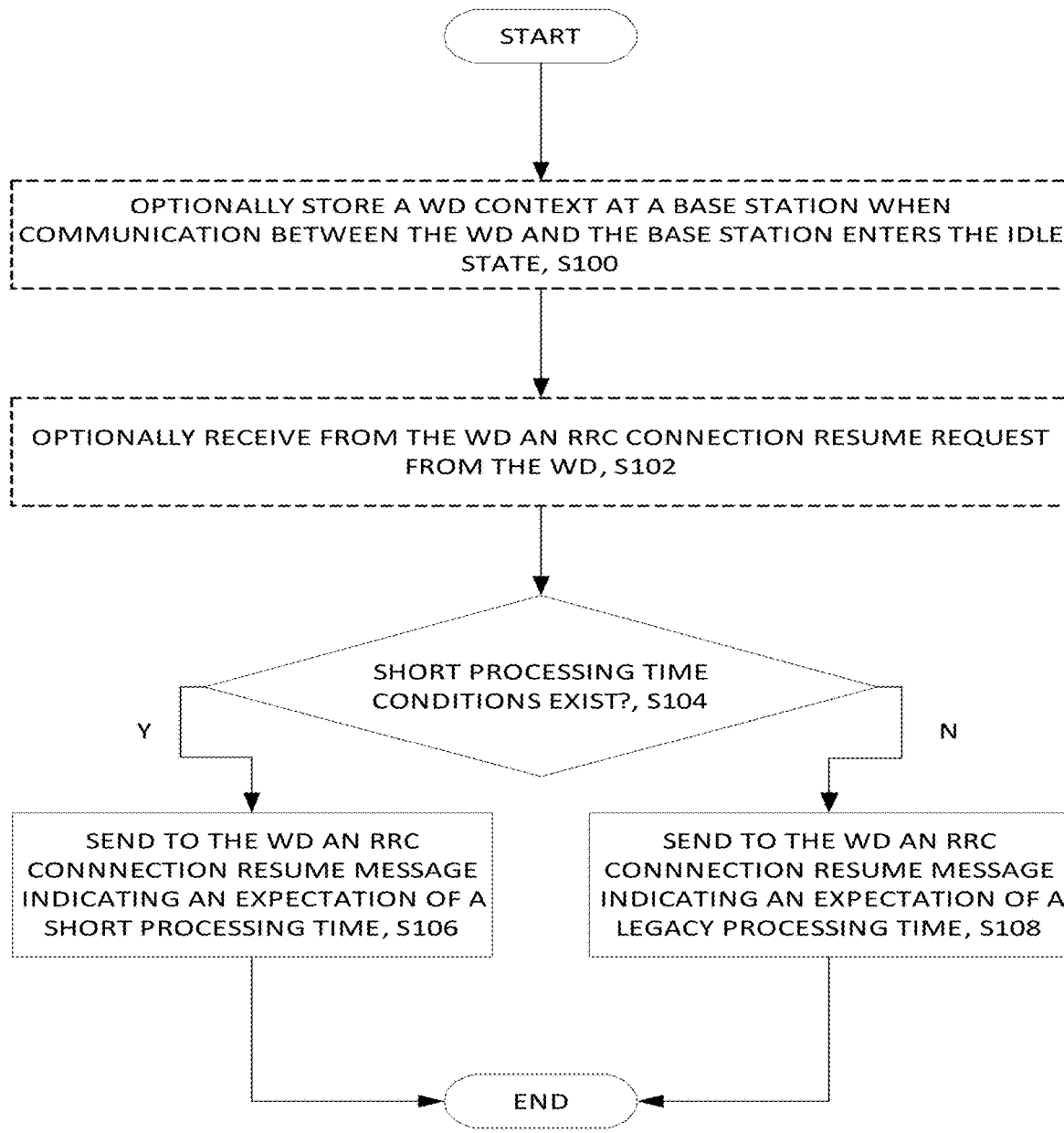
FIG. 8 is a flowchart of an exemplary process for setting a processing time for responding to a radio resource control, RRC, connection resume message by a wireless device, WD.

FIG. 8 is a flowchart of an exemplary process for setting a processing time for responding to a radio resource control, RRC, connection resume message by a wireless device, WD 40. The process optionally includes storing a WD context at the base station 20 when communication between the WD 40 and the base station 20 enters an idle state (block S100). The process also optionally includes receiving from the WD 40 via the receiver 32 a radio resource control, RRC, connection resume request (block S102). The process also includes determining when short processing time conditions exist (block S104). For example, short processing time conditions may be determined to exist if the reconfiguration of the RRC connection for the WD uses steps from a predefined set of steps. Alternatively or additionally, short processing time conditions may be determined to exist if the reconfiguration of the RRC connection for the WD uses only parameters which are mandatory to signal. Alternatively or additionally, short processing time conditions may be determined to exist if the reconfiguration of the RRC connection for the WD updates only security keys. When short processing time conditions exist, the process includes sending to the WD 40 via the transmitter 34 a message (e.g. an RRC connection resume message) indicating an expectation of a short processing time (block S106). When short processing time conditions do not exist, the process includes sending to the WD 40 via the transmitter 34 an RRC connection resume message indicating an expectation of a legacy processing time (block S108).

Figure 9:
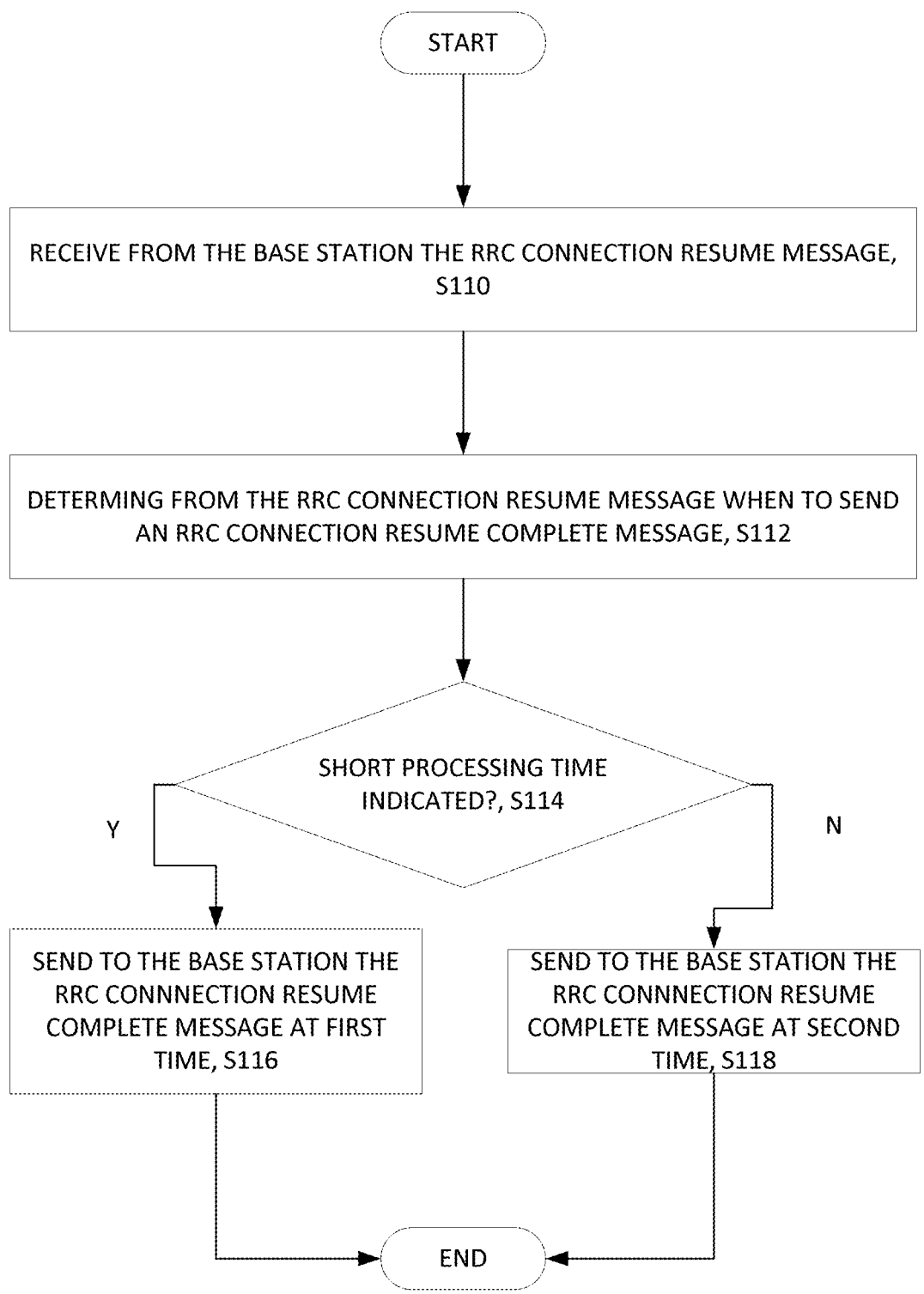
FIG. 9 is a flowchart of an exemplary process in a wireless device, WD, for responding to a radio resource control, RRC, connection resume message from a base station.

FIG. 9 is a flowchart of an exemplary process in a wireless device, WD, 40 for responding to a radio resource control, RRC, connection resume message from a base station 20. The process includes receiving from the base station 20 via the receiver 52 the RRC connection resume message (block S110). The process also includes determining from a message received from the base station (e.g. the RRC connection resume message) when to send an RRC connection resume complete message 50 (block S112). The process also includes determining whether a short processing time is indicated (block S114). The process also includes sending to the base station 20 via the transmitter 54 the RRC connection resume complete message at a first time when the message indicates an expectation of a short processing time (block S116). The process also includes sending to the base station 20 via the transmitter 54 the RRC connection resume complete message at a second time when the message indicates an expectation of a legacy processing time (block S118).

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

The invention claimed is:

1. A method in a base station for setting a processing time for a wireless device, WD, to respond to a radio resource control, RRC, connection resume message, the RRC connection resume message relating to one of establishment and reconfiguration of an RRC connection for the WD, the method comprising:
   determining when short processing time conditions exist in relation to the one of establishment and reconfiguration of the RRC connection for the WD, the determining of when short processing time conditions exists including determining that the reconfiguration of the RRC connection for the WD uses only parameters which are mandatory to signal;
   when short processing time conditions exist, sending to the WD a message indicating a short processing time; and
   when short processing time conditions do not exist, sending to the WD a message indicating a legacy processing time.

2. The method of claim 1, wherein the message indicating the short processing time, or the message indicating the legacy processing time, is one of: an RRC connection resume message; a system information message; a L1/L2 control message; a L2 control message; and an RRC message.

3. The method of claim 1, further comprising:
   storing a WD context at the base station when communication between the WD and the base station enters an idle state; and
   receiving from the WD a radio resource control, RRC, connection resume request.

4. The method of claim 1, wherein the message indicates a time at which the WD is to transmit an RRC connection resume complete message.

5. The method of claim 1, wherein determining when short processing time conditions exists includes determining that the reconfiguration of the RRC connection for the WD uses steps from a predefined set of steps.

6. A method in a base station for setting a processing time for a wireless device, WD, to respond to a radio resource control, RRC, connection resume message, the RRC connection resume message relating to one of establishment and reconfiguration of an RRC connection for the WD, the method comprising:

determining when short processing time conditions exist in relation to the one of establishment and reconfiguration of the RRC connection for the WD, the determining of when short processing time conditions exists including determining that the reconfiguration of the RRC connection for the WD updates only security keys;

when short processing time conditions exist, sending to the WD a message indicating a short processing time; and when short processing time conditions do not exist, sending to the WD a message indicating a legacy processing time.

7. A base station for setting a processing time for a wireless device, WD, to respond to a radio resource control, RRC, connection resume message, the RRC connection resume message relating to one of establishment and reconfiguration of an RRC connection for the WD, the base station comprising:

processing circuitry configured to:
determine when short processing time conditions exist in relation to the establishment or reconfiguration of the RRC connection for the WD, the determining of when short processing time conditions exists including determining that the reconfiguration of the RRC connection for the WD uses only parameters which are mandatory to signal;

a transmitter configured to:
send to the WD a message indicating a short processing time, when short processing time conditions exist; and
send to the WD a message indicating a legacy processing time when short processing time conditions do not exist.

8. The base station of claim 7, wherein the message indicating the short processing time, or the message indicating the legacy processing time, is one of: an RRC connection resume message; a system information message; a L1/L2 control message; a L2 control message; and an RRC message.

9. The base station of claim 7, wherein the processing circuitry is further configured to store a WD context at the base station when communication between the WD and the base station enters an idle state and the base station further comprises a receiver configured to receive from the WD a radio resource control, RRC, connection resume request.

10. The base station of claim 7, wherein the message indicates a time at which the WD is to transmit an RRC connection resume complete message.

11. The base station of claim 7, wherein determining when short processing time conditions exists includes determining that reconfiguration of the WD uses steps from a predefined set of steps.

12. The base station of claim 7, wherein determining when short processing time conditions exists includes determining that reconfiguration of the WD updates only security keys.

13. A method in a wireless device, WD, for responding to a radio resource control, RRC, connection resume message from a base station, the RRC connection resume message relating to one of establishment and reconfiguration of an RRC connection for the WD, the method including:

receiving from the base station the RRC connection resume message;

determining from a message received from the base station when to send an RRC connection resume complete message;

sending to the base station the RRC connection resume complete message at a first time when the message indicates a short processing time; and sending to the base station the RRC connection resume complete message at a second time when the message indicates a legacy processing time, one of the short processing time and the legacy processing time being chosen based on conditions determined at the base station.

14. The method of claim 13, wherein the message is one of: the RRC connection resume message; a system information message; a L1/L2 control message; a L2 control message; and an RRC message.

15. The method of claim 13, wherein the message indicates a time at which the WD is to transmit the RRC connection resume complete message.

16. The method of claim 13, wherein the WD determines a first time based on a processing time associated with a reconfiguration of the WD.

17. The method of claim 16, wherein the processing time associated with a reconfiguration of the WD is known at the base station.

18. A wireless device, WD, for responding to a radio resource control, RRC, connection resume message from a base station, the RRC connection resume message relating to one of establishment and reconfiguration of an RRC connection for the WD, the WD including:

a receiver configured to receive from the base station the RRC connection resume message;

processing circuitry configured to determine from a message received from the base station when to send an RRC connection resume complete message;

a transmitter configured to:
send to the base station the RRC connection resume complete message at a first time when the message indicates a short processing time; and
send to the base station the RRC connection resume complete message at a second time when the message indicates a legacy processing time, one of the short processing time and the legacy processing time being chosen based on conditions determined at the base station.

19. The WD of claim 18, wherein the message is one of: the RRC connection resume message; a system information message; a L1/L2 control message;

a L2 control message; and an RRC message.

20. The WD of claim 18, wherein the message indicates a time at which the WD is to transmit the RRC connection resume complete message.

21. The WD of claim 18, wherein the WD determines a first time based on a processing time associated with a reconfiguration of the WD.

22. The WD of claim 21, wherein the processing time associated with a reconfiguration of the WD is known at the base station.

* * * * *